United States Patent
Pang et al.

(10) Patent No.: US 7,400,794 B1
(45) Date of Patent: Jul. 15, 2008

(54) TRANSPORT OPTICAL FIBER FOR Q-SWITCHED LASERS

(75) Inventors: H. Yang Pang, San Jose, CA (US); John Rusty Harris, Redwood City, CA (US); R. Ian Edmond, Meadow Vista, CA (US); John Brekke, Cool, CA (US); Kelly Child, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/824,449

(22) Filed: Jun. 29, 2007

(51) Int. Cl.
*G02B 6/26* (2006.01)
*G02B 6/36* (2006.01)

(52) U.S. Cl. ............... 385/31; 385/33; 385/39; 385/88; 385/92; 385/93; 385/123

(58) Field of Classification Search ........... 385/15, 385/31, 33, 39, 88, 92, 93, 123
See application file for complete search history.

(56) References Cited

U.S. PATENT DOCUMENTS

| 4,678,273 A | 7/1987 | Vilhelmsson | 350/96.3 |
| 5,619,602 A * | 4/1997 | Sandstrom et al. | 385/31 |
| 6,167,177 A | 12/2000 | Sandström et al. | 385/100 |

\* cited by examiner

*Primary Examiner*—Frank G Font
*Assistant Examiner*—Michael P Mooney
(74) *Attorney, Agent, or Firm*—Stallman & Pollock LLP

(57) ABSTRACT

An optical fiber assembly includes a clad optical fiber having an end-cap thereon. Radiation is focused into the optical fiber via the end-cap. A roughened portion of the fiber cladding behind the end-cap allows any radiation focused into the fiber and propagating in the cladding to escape the optical fiber. A concave reflector surrounding the optical fiber reflects the escaped radiation away from the fiber assembly. A connector for connecting the optical fiber to a laser includes an air-cooled beam-dump for receiving the radiation reflected away from the optical fiber.

15 Claims, 1 Drawing Sheet

TRANSPORT OPTICAL FIBER FOR Q-SWITCHED LASERS

TECHNICAL FIELD OF THE INVENTION

The present invention relates in general to transport of laser radiation via optical fibers. The invention relates in particular to an input configuration for a transport optical fiber used to transport output radiation from a high power Q-switched laser.

DISCUSSION OF BACKGROUND ART

Clad optical fibers are commonly used to transport radiation from a laser and deliver the radiation at a location remote from the laser where the radiation is required. The cladding of such fibers is typically protected by a polymer sleeve or jacket that covers the cladding of the fiber along the entire length thereof. The fiber and jacket are incorporated in a fiber assembly in which the jacketed fiber is enclosed in a flexible armored sheath having a diameter several times greater than the jacketed clad fiber.

The design of transport fiber arrangements for CW radiation is relatively straightforward. The design of transport fiber arrangements for radiation from high-power Q-switched lasers that deliver laser radiation in pulses, however, can be challenging and becomes increasingly difficult with increasing peak power of the laser radiation pulses. One principle problem that must be overcome is surface damage at the input face of the optical fiber. Another principle problem that must be overcome is heating and damage heating and damage of the fiber protective polymer jacket (see, U.S. Pat. No. 4,678, 273). This occurs as a result of some input radiation being directed into the fiber cladding and subsequently escaping from the cladding to be absorbed in the material of the polymer jacket in contact with the cladding. Typically the percentage of input radiation that enters the cladding is less than about 5% of the total. In the case of a laser with 1000 Watts (W) average power output, however, this would potentially result in 50 Watts of radiation being absorbed in the fiber jacket.

One method of reducing surface damage is to contact an elongated glass block to the input face of the optical fiber. The output beam from the laser is focused through the glass block onto the interface between the block and the optical fiber. The input face of the glass block is typically furnished with an anti-reflection coating optimized for the wavelength of the laser radiation. The length of the glass block is selected such that the laser beam at the input surface of the block has a diameter large enough (consistent with the peak pulse power of the radiation) that the peak intensity of radiation is below the damage threshold of the input face of the glass block or any coating thereon. Such an arrangement is described in U.S. Pat. No. 5,619,602. This and similar arrangements are relatively straightforward to implement and do not add significantly to the cost or complexity of the transport optical fiber.

An approach that has been suggested for dealing with damage to the protective polymer jacket of a transport fiber is to encourage radiation in the cladding to leak out of the cladding and be absorbed by a light absorber incorporated in the fiber assembly. The light absorber is water cooled to remove heat generated by the absorbed radiation. This approach is described in U.S. Pat. No. 6,167,177. While the approach is apparently effective, water channels must be provided around the input end of the fiber assembly which considerably increases the complexity of the fiber assembly design. There is a need for a method for removing cladding-mode radiation that does not require water-cooling the input end of the fiber assembly.

SUMMARY OF THE INVENTION

The present invention is directed to apparatus for connecting an optical fiber to a laser. In one aspect, apparatus in accordance with the present invention comprises an optical fiber assembly, including an optical fiber, a transparent end-cap, and a cladding. The optical fiber has a core surrounded by a cladding in optical contact therewith. The transparent end-cap has a diameter greater than the cladding diameter of the optical fiber and has first and second opposite ends. The first end of the end-cap is attached to an end of the optical fiber, and the second end of the end-cap is free, such that radiation can be directed into the attached end of the optical fiber via the second end of the end-cap. A portion of the optical fiber behind the second end of the end-cap is roughened such that radiation directed into the optical fiber and propagating in the cladding escapes the cladding. A concave reflector is provided having an open output-end and a vertex end that surrounds the roughened portion of the optical fiber with the output end of the reflector directed toward the attached end of the optical fiber. The output end of the reflector has a diameter greater than the diameter of the end-cap. The reflector is arranged with respect to the roughened portion of the fiber such that the radiation escaping the fiber cladding is reflected out of the output end of the reflector away from the fiber assembly.

In another aspect of apparatus in accordance with the present invention, the optical fiber assembly is surrounded by a rigid sheath is a rigid sheath and wherein the second end-portion of the sheath is arranged to accept a flexible sheath for protecting the optical fiber. The apparatus includes a connector, having a bore therein arranged to receive the sheath. A base portion of the bore is arranged to provide an area of receiving surface for absorbing the radiation directed out of the optical fiber assembly by the reflector. Cooling fins around the connector expedite removal of heat caused by the absorption of the radiation.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
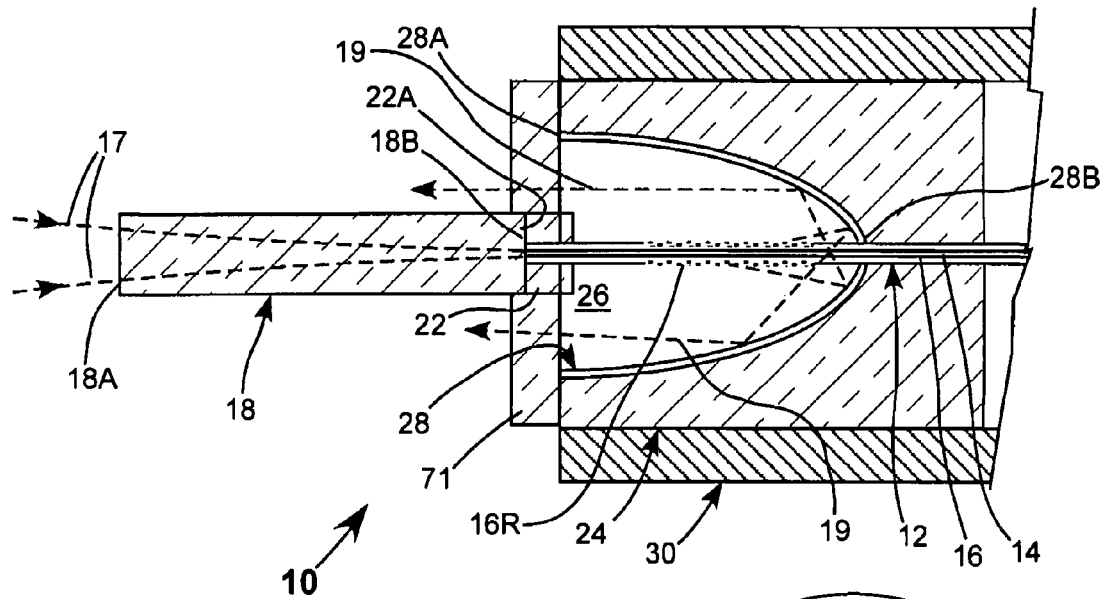
FIG. 1 is a longitudinal cross-section view schematically illustrating a preferred embodiment of an arrangement in accordance with the present invention for terminating a clad optical fiber, including transparent end-cap attached to an end of the clad fiber having a diameter greater than the fiber cladding, a mode stripping section of the optical fiber located behind the end-cap and a concave reflector surrounding the mode stripping section of the optical fiber and having a diameter significantly greater than the diameter of the end-cap.
Figure 1A:
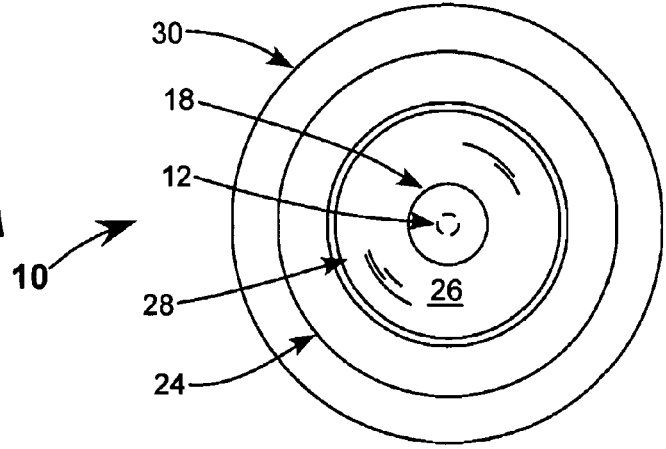
FIG. 1A is a front-end elevation view schematically illustrating further detail of the optical-fiber terminating arrangement of FIG. 1.
Figure 2:
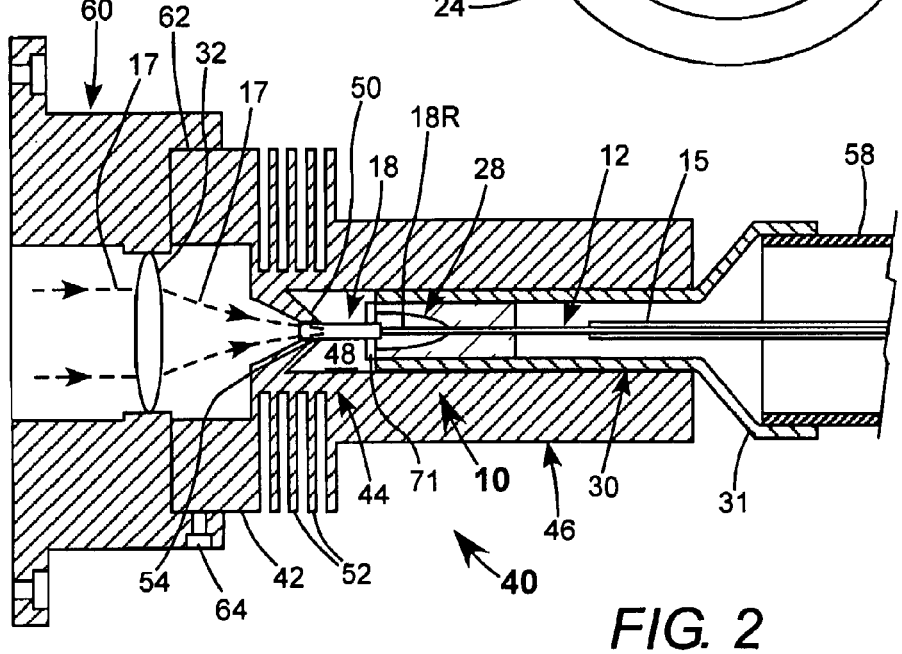
FIG. 2 schematically illustrates a preferred embodiment of an arrangement for coupling the terminated end of the optical-fiber of FIG. 1 to a laser.

Referring now to the drawings, wherein like components are designated by like reference numerals, FIG. 1 and FIG. 1A schematically illustrate a preferred embodiment 10 of an arrangement in accordance with the present invention for terminating an optical fiber 12. FIG. 2 schematically illustrates a preferred embodiment of an arrangement in accordance with the present invention for coupling the terminated end of the optical-fiber of FIG. 1 to a laser (not shown) for receiving output radiation 17 from the laser.

Fiber 12 includes a core 14 having a cladding 16 in optical contact therewith. A transparent end-cap 18 having a diameter greater than the diameter of cladding 16 is attached in optical contact to an end of clad fiber 12. Preferably, the end-cap has a diameter at least about five-times greater than diameter of cladding 16. At the power levels contemplated, the core of fiber 12 may have a minimum diameter of about 800 micrometers (µm) or greater, with a cladding thickness of about 100 µm, i.e., a total diameter of the fiber may be about 1 millimeter (mm) or greater. In this example, the attachment of the end-cap to the fiber effected by bonding a ferrule 22 around the end of the optical fiber, polishing the free end of the ferrule until the ferrule and the fiber end have a common surface 22A, then optically contacting that surface to surface 18B of the end-cap.

Output radiation 17 from the laser is focused by a lens 32 into the optical fiber via free-end face 18A of end-cap 18. An advantage of this is that face 18A has a diameter that is more convenient for receiving an antireflection coating (not shown) than an end of the optical fiber. Further, the output beam diameter on face 18A of the end-cap is significantly greater than the diameter of the beam on the end of the fiber which minimizes the possibility of causing optical damage to the coating. Optical contact between end-face 18B of the end-cap and common face 22A of the fiber and ferrule allows reflection-loss-free transfer of radiation 17 into fiber 12 without the need for an antireflection coating.

It is not practical to transfer all of radiation 17 into core 14 of fiber 12. Some radiation will enter cladding 16 of the fiber. As discussed above the amount of radiation entering cladding 16 may be only about 5% in relative terms, but this percentage of a one-kilowatt beam will be 50 W. In order to remove this radiation from cladding 16 a portion 16R of the cladding behind end-cap 18 (in the normal direction of propagation of radiation) is roughened to allow radiation to escape the cladding. A roughened length of about 35.0 mm can provide that at least 95% of the radiation escapes. This radiation escape is usually referred to as "mode-stripping" by practitioners of the art.

A concave reflector 28 surrounds the mode stripping section of the optical fiber and having a diameter significantly greater than the diameter of the end-cap. Reflector 28, here is formed by applying a reflective coating to the surface of a concave recess 26 in a fiber-clamping and fiber-alignment block 24. Reflector 28 reflects radiation escaping for roughened cladding 18R away from the fiber assembly past end-cap 18 as indicated by dashed lines 19. As reflector 28 does not have a precision optical function the concave shape is not critical. The reflection of radiation out of the output end of the reflector can be via a single reflection or multiple reflections. Block 24 can be made from any material but is preferably made from a material that has about the same thermal coefficient of expansion as that of the material of the optical fiber cladding.

One convenient way to make block 24 is to make the block in two diametrically-opposed portions with a longitudinal groove of semi-circular cross-section in each for receiving optical fiber 12. This will facilitate bonding the completed block to the optical fiber. In this way, the vertex-end 28B of the concave reflector will be in contact with the optical fiber. Block 24 is bonded to the optical fiber with open-end (output-end) 28A of reflector 28 directed toward end-cap 18. Preferably, the open end of the reflector has a diameter at least about 5 times greater than the diameter of end-cap 18, preferably between about 5 times and 10 times greater. This serves, inter alia, to minimize the chance of radiation returning though the end cap and being fed back into the laser.

Clamping and alignment block 24 is held in a connecting sheath (connector) 30 such that the connecting sheath surrounds reflector 28 and optical fiber 12. Radiation leaking out of roughened portion 16R of cladding 16 is collected by the reflector and directed out of open end of 28A of the reflector without intercepting connecting sheath 30. End-cap 18 is held in an aperture in a transparent disc 71 bonded to the front of the clamping block over the open end of the connector.

Continuing now with particular reference to FIG. 2, for connecting fiber assembly 10 to a laser or optical amplifier a receiver 40 is provided. Receiver 40 includes a base portion 42, a beam-dump portion 44, and a socket portion 46 having a cylindrical bore 48 therein for receiving connecting sheath 30 of the fiber assembly. Sheath 30 is assumed here to be made of a rigid material, preferably a metal.

A conical base 50 of bore 48 together with walls of the bore form a radiation-receiving surface for the beam dump portion of the receiver. This radiation-receiving surface has a very large area compared with the surface area of end-cap 18 thereby minimizing the temperature rise caused by absorption of the radiation. There is an aperture 54 in the conical base arranged to receive end-cap 18 of the fiber assembly. Aperture 54 of the conical base and clamping block 24 and disc 71 maintain the end-cap in alignment for receiving radiation 17 from the laser. Connecting sheath 30 has an expanded portion 31 thereof arranged to receive a flexible protective sheath 58 (usually wire reinforced) for protecting the length of optical fiber 12 not protected by sheath 30. This expanded portion of connecting sheath 30 also serves as a positive stop to limit the travel of connecting sheath 30 in aperture 48 of the receiver. It is recommended that a sufficient amount of the usual polymer jacket 15 of the optical fiber be stripped from the- fiber as indicated in FIG. 2 to allow positive attachment of block 24 and end-cap 18 to the fiber.

Radiation directed out of the fiber assembly from reflector 28 of the fiber assembly is absorbed in the radiation-receiving surface of beam-dump portion 44 of connector 40. Cooling fins 52 extending along the beam dump portion of the connector present a conductive and radiative surface having an area much greater than the radiation-receiving area. This, combined with the minimized temperature rise resulting from the relatively large radiation-receiving area of the connector, provides that heat resulting from the absorption of radiation by the beam dump is quickly removed from the connector without any requirement for water-cooling.

In the arrangement of FIG. 2, connecting sheath (connector) 30 is plugged into a flange 60 attachable to the housing (not shown) of a laser that provides beam 17. The base portion of the receiver is a preferably a running close fit in an aperture 62 of the flange, and can be retained in position by a set screw 64. This close fit also functions to allow precision focal distance adjustment such that lens 32 located in the flange can optimally focus beam 17 into end-cap 18 and thereby into optical fiber 12. This particular arrangement is preferred for convenience of manufacture and assembly should not be considered as limiting the invention. By way of example: the lens 32 may also be omitted from the flange and located within the laser housing; the flange and the receiver may be combined in a single unit; or the flange may be an integral part of a laser housing.

The present invention is described above in terms of a preferred and other embodiments. The invention is not limited, however, to the embodiments described and depicted. Rather, the invention is limited only by the claims appended hereto.

What is claimed is:

1. Apparatus comprising:
   an optical fiber assembly, including an optical fiber, a transparent end-cap, and a concave reflector;
   the optical fiber has a core surrounded by a cladding in optical contact therewith, the cladding having a diameter;
   the transparent end-cap has a diameter greater than the cladding diameter of the optical fiber, and has first and second opposite ends, the first end of the end-cap being attached to an end of the optical fiber, and the second end of the end-cap being free, such that radiation can be directed into the attached end of the optical fiber via the second end of the end-cap, with a portion of the optical fiber behind the second end of the end-cap being roughened such that radiation directed into the optical fiber and propagating in the cladding escapes the cladding; and
   a concave reflector having an open output-end and a vertex-end surrounding the roughened portion of the optical fiber with the output end of the reflector directed toward the attached end of the optical fiber and having a diameter greater than the diameter of the end-cap, the reflector being arranged with respect to the roughened portion of the fiber such that the radiation escaping the cladding is reflected out of the output end of the reflector away from the fiber assembly.

2. The apparatus of claim 1, wherein the output end of the reflector has a diameter at least about 5 times greater than the diameter of the end-cap.

3. The apparatus of claim 1, wherein the end-cap is attached to the optical fiber via an optical contact with a ferrule bonded around the end of the optical fiber.

4. The apparatus of claim 1, wherein the optical fiber assembly further includes a connecting sheath having first and second opposite end-portions, the first end portion of the sheath surrounding the reflector and the optical fiber, and being arranged with respect to the reflector such that none of the radiation reflected out of the reflector is intercepted by the first portion of the sheath.

5. The apparatus of claim 4, wherein the reflector is formed on the surface of a concave recess in a block of solid material closely fitting in the sheath and surrounding the optical fiber.

6. The apparatus of claim 5, wherein the connecting sheath is a rigid sheath and wherein the second end-portion of the sheath is arranged to accept a flexible sheath for protecting the optical fiber beyond the connecting sheath.

7. The apparatus of claim 6, further including a receiver, the receiver having a bore therein arranged to receive the first portion of the connecting sheath of the optical fiber assembly, a base portion of the bore being arranged to provide an area of receiving surface for absorbing the radiation directed out of the optical fiber assembly by the reflector.

8. The apparatus of claim 7, wherein the receiver includes cooling fins surrounding the base portion of the assembly for removing heat generated as a result of the absorption of radiation in the radiation-receiving surface of the base portion of the bore in the connector.

9. The apparatus of claim 8, wherein the base of the bore in the receiver has an aperture therein has an aperture therein arranged to receive the end-cap of the optical fiber assembly.

10. The apparatus of claim 9, further including a flange arranged to accept the receiver, the flange having a lens therein for focusing a beam of radiation to the end-cap of the optical fiber when the end-cap of the optical fiber assembly is received in the aperture in the base portion of the bore of the connector.

11. An optical fiber connector comprising:
    an optical fiber having a core and a cladding and with a portion of the cladding near the input end of the fiber begin roughened to permit light traveling in the cladding to escape the fiber; and
    a conical reflector mounted around the input end of the fiber and aligned with said roughened portion of the cladding and oriented to direct light escaping the fiber in a direction generally opposite the propagation direction within the fiber.

12. An optical fiber connector as recited in claim 11, further including a heat sink positioned to absorb light reflected by the reflector.

13. An optical fiber connector as recited in claim 11, further including a transparent member connected to the input end of the fiber and having a diameter greater than the diameter of the fiber for receiving input light.

14. An optical fiber connector comprising:
    a heat sink having a central bore;
    an optical fiber having an input end located within the central bore of the heat sink, said optical fiber having a core and a cladding and with a portion of the cladding near the input end of the fiber being roughened to permit light traveling in the cladding to escape the fiber; and
    an alignment block mounted within the central bore and supporting the input end of the fiber, said alignment block including a concave recess aligned with the roughened portion of the cladding, said recess having a reflective surface oriented to direct light escaping the fiber in a direction generally opposite the propagation direction within the fiber and towards the inner surface of the central bore of the heat sink.

15. An optical fiber connector as recited in claim 14, further including a transparent member connected to the input end of the fiber and having a diameter greater than the diameter of the fiber for receiving input light.

* * * * *